Dec. 8, 1936. T. C. MOORSHEAD 2,063,555
MEANS FOR CIRCULATING GLASS IN GLASS FURNACE
GATHERING BASINS OR FOREHEARTHS
Filed March 4, 1935 2 Sheets-Sheet 2
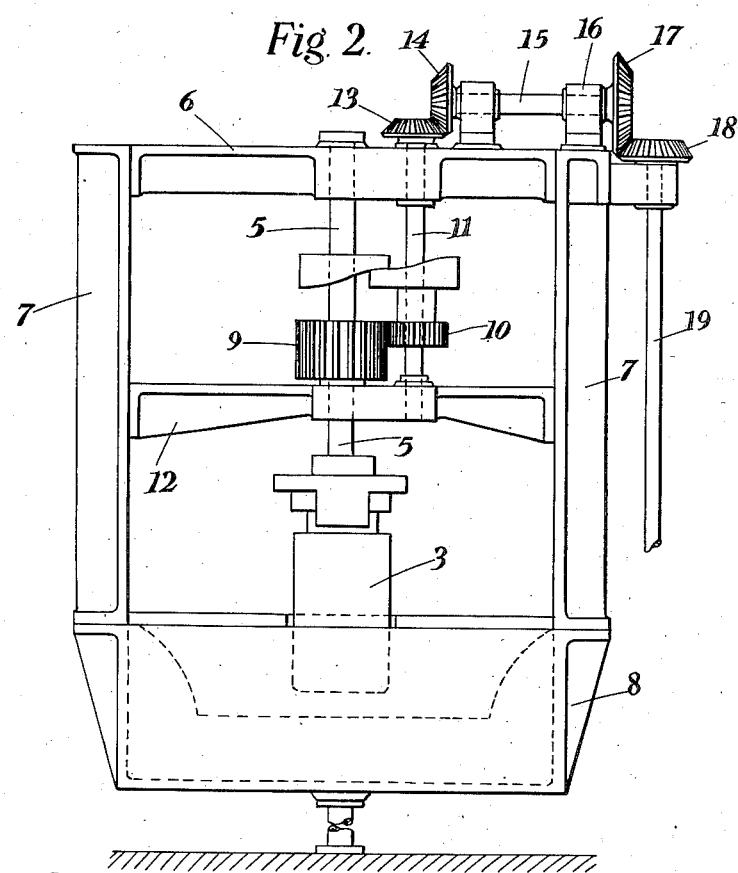
Fig. 2.
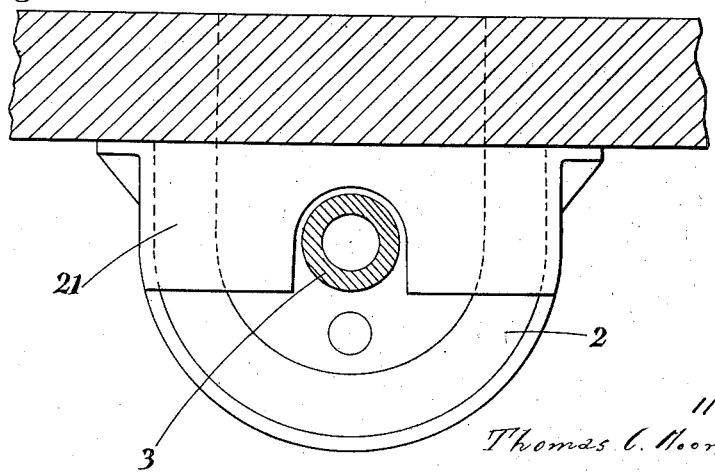
Fig. 3.
INVENTOR:
Thomas C. Moorshead
BY 
ATTORNEY Patented Dec. 8, 1936

2,063,555

UNITED STATES PATENT OFFICE 2,063,555

MEANS FOR CIRCULATING GLASS IN GLASS FURNACE GATHERING BASINS OR FOREHEARTHS

Thomas Courtney Moorshead, London, England, assignor to The United Glass Bottle Manufacturers Limited, London, England, a British company Application March 4, 1935, Serial No. 9,296
In Great Britain February 12, 1935

3 Claims. (Cl. 49—56)

This invention relates to methods of and means for circulating glass in glass furnace gathering basins or forehearths and particularly in the gathering basins or forehearths employed in conjunction with suction fed glass forming machines.

As is well known, it is essential that the glass contained in a gathering forehearth or basin should be maintained at an even consistency and the chief object of the present invention is to provide an improved and simplified form of circulating means for achieving this result.

According to one feature of the invention the circulation is created by a vertically disposed rotary member of refractory material which is caused to rotate about its vertical axis and is arranged so that its lower end is immersed in the mass of glass contained in the basin or forehearth.

According to another feature of the invention the circulation is created by a vertically or substantially vertically disposed rotary member of refractory material to which is imparted a combined reciprocating and rotary movement and which is arranged with its lower end immersed in the mass of glass contained in the basin or forehearth.

The aforesaid rotary member is preferably of cylindrical form and may be hollow or solid and open or closed at its lower end. Also, in some instances, it may be found expedient to provide projections, flutes or ribs upon the outer surface of said rotary member or otherwise to shape the outer contour of rotary member so as to enhance its circulatory action.

Further features of the invention will be hereinafter described.

In order that the said invention may be clearly understood and readily carried into effect, the same will now be more fully described with reference to the accompanying drawings in which:—

Fig. 2 is a side view of the arrangement shown in Fig. 1, and

Fig. 3 is a sectional plan view of the forehearth.

Figure 1:
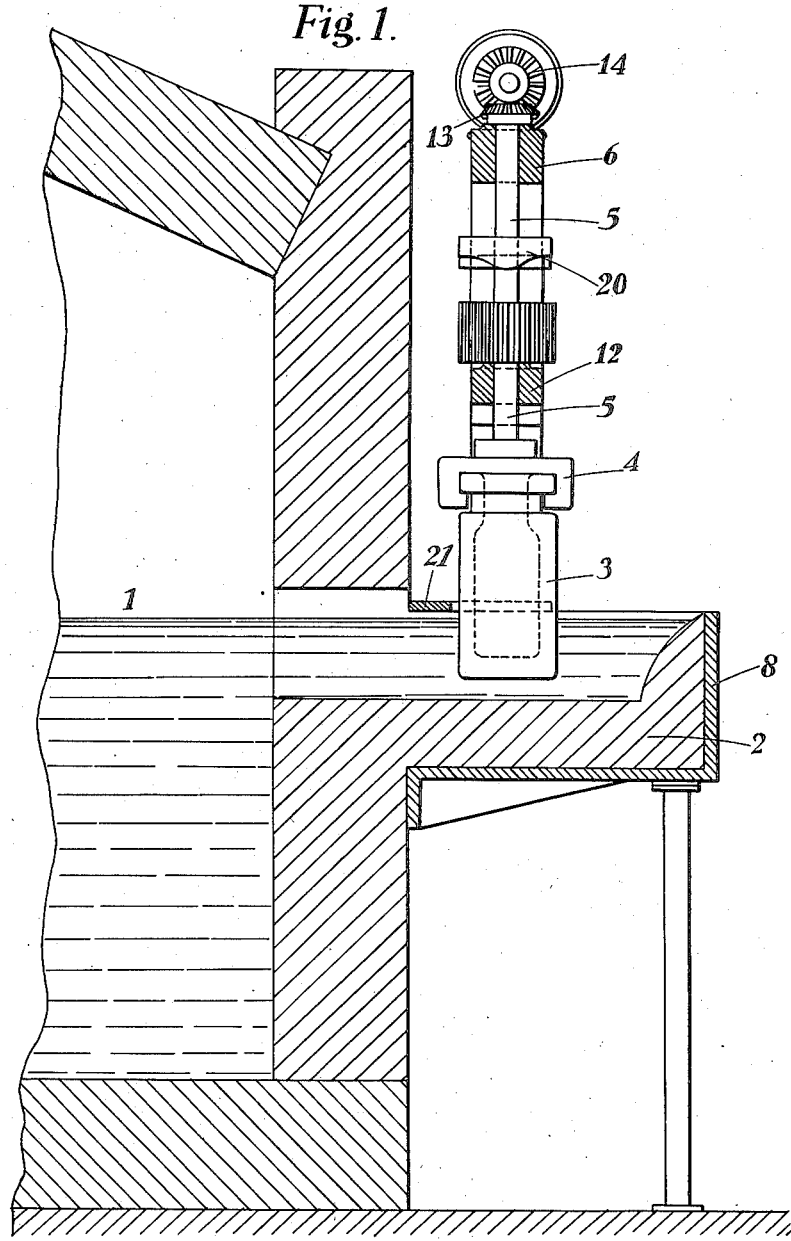
Fig. 1 is a vertical sectional view of the refining end of a glass furnace equipped with a rotary member for carrying out the invention.

As will be seen from Fig. 1, the refining end 1 of the furnace is provided with a forehearth or gathering basin 2 into which depends a rotary glass circulating member 3 composed of refractory material and having its lower end immersed in the mass of glass contained in the forehearth.

The rotary member is shown as of cylindrical form and with a smooth periphery. Also, in order to reduce its weight, the rotary member is preferably made hollow. The rotary circulating member is carried by a cap 4 secured to the lower end of a vertically disposed shaft 5 which is supported at its upper end by a cross bracket 6 which, in turn, is supported in position above the forehearth by a pair of vertical columns 7 extending upwardly from the forehearth supporting member 8. The vertical columns 7 also support a second cross bracket 12 disposed below the cross bracket 6 and a short distance above the cap 4, the shaft 5 being journalled in both of said brackets.

The means for rotating the shaft 5 and the circulating member carried thereby preferably comprise a toothed wheel 9 secured to the portion of the shaft 5 above the cross bracket 12 and meshing with another pinion 10 secured to a driving shaft 11 which is disposed in parallel relationship with the shaft 5 and is also journalled at its ends in the cross brackets 6 and 12. The driving shaft 11 may be driven from any suitable source of power so that the glass circulating member 3 is rotated at a speed consonant with the nature of the glass but it is preferably suitably connected with the glass forming machine so as to be actuated thereby. For instance, the upper end of the shaft 11 may be fitted with a bevel pinion 13 meshing with another bevel pinion 14 keyed to a horizontally disposed shaft 15 suitably journalled in bearings 16 carried by the cross bracket 6 and the shaft 15 may be coupled as, for example, by two additional bevel pinions 17 and 18 to a vertically disposed shaft 19 which is, in turn, suitably connected with the glass forming machine or its actuating means.

In the preferred embodiment of the invention, means are provided for imparting a reciprocating movement to the glass circulating member in addition to its rotary movement. For this purpose, the shafts 5 and 11 may be provided with a pair of co-operating cams 20 which are adapted to bear against one another and cause the shaft 5 to be alternately raised and lowered, the pinion 9 being formed so that its width is sufficient to ensure that it will be maintained in engagement with the pinion 10 throughout its vertical movements.

The upper part of the forehearth is preferably covered in by a cover 21 so that only the minimum amount of glass at the gathering position is exposed, the said cover being suitably formed so as to extend around the glass circulating member as is indicated in Fig. 3. The said cover may be made of a heat resisting alloy or refractory clay material.

From the foregoing it will be appreciated that the invention provides a simple and convenient form of glass circulating means which will overcome many of the difficulties hitherto experienced particularly when the rotary action of the circulating member is supplemented by a vertical reciprocating movement as above described.

Having thus described my invention, what I claim as new therein and desire to secure by Letters Patent is:—

1. In combination with a glass furnace having a forehearth containing molten glass from the surface of which charges of glass are removed by suction, a glass circulating member having a smooth periphery of cylindrical form, the lower end of the glass circulating member being immersed in the mass of glass in the forehearth, a vertically disposed shaft, means detachably connecting the upper end of the glass circulating member with the lower end of said vertically disposed shaft, means for rotating said shaft about its vertical axis, said rotating means including a driving shaft disposed parallel to said vertical shaft and gearing coupling said shafts, and means including a pair of inter-engaging face cams disposed one on each of the said shafts to cause the glass circulating member to rise and fall as it is rotated.

2. In combination with a glass furnace having a forehearth containing molten glass from the surface of which charges of glass are removed by suction, a glass circulating member having a smooth periphery of cylindrical form, the lower end of the glass circulating member being immersed in the mass of glass in the forehearth, a vertically disposed shaft, means connecting the upper end of the glass circulating member with the lower end of said vertically disposed shaft, a driving shaft disposed parallel to said vertical shaft, gearing coupling said vertical shaft with said driving shaft, a disc supporting said vertically disposed shaft in position, a second disc carried by the driving shaft and bearing against the underside of the disc on the vertically disposed shaft, the inter-engaging faces of the said discs being mutually contoured to cause the glass circulating member to rise and fall in a vertical path as it is rotated.

3. In combination with a glass furnace having a forehearth containing molten glass from the surface of which charges of glass are removed by suction, a glass circulating member having a smooth periphery of cylindrical form, the lower end of the glass circulating member being immersed in the mass of glass in the forehearth, a vertically disposed shaft, means connecting the upper end of the glass circulating member with the lower end of said vertically disposed shaft, a driving shaft, gearing coupling said vertically disposed shaft with the driving shaft, a cam on the vertically disposed shaft, and a second cam on the driving shaft, said cams being in contact with one another and cooperating to cause the glass circulating member to rise and fall in a vertical path as it is rotated.

THOMAS COURTNEY MOORSHEAD.